United States Patent
Mitome et al.

(10) Patent No.: US 7,769,031 B2
(45) Date of Patent: Aug. 3, 2010

(54) VIRTUAL MACHINE SYSTEM AND METHOD OF NETWORK COMMUNICATION BETWEEN VIRTUAL MACHINES

(75) Inventors: Hiroyuki Mitome, Hadano (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 11/635,912

(22) Filed: Dec. 7, 2006

(65) Prior Publication Data

US 2007/0140263 A1 Jun. 21, 2007

(30) Foreign Application Priority Data

Dec. 7, 2005 (JP) ............................. 2005-352847

(51) Int. Cl.
*H04L 12/46* (2006.01)
(52) U.S. Cl. ........................ 370/401; 370/420; 370/463; 709/245
(58) Field of Classification Search ................. 370/400, 370/401, 419–421, 463; 709/223–226, 245
See application file for complete search history.

(56) References Cited

U.S. PATENT DOCUMENTS

| 7,047,314 | B2 * | 5/2006 | Sato et al. .................... 709/238 |
| 7,093,280 | B2 * | 8/2006 | Ke et al. ......................... 726/3 |
| 7,366,784 | B2 * | 4/2008 | Ishizaki ...................... 709/228 |
| 7,515,589 | B2 * | 4/2009 | Bacher et al. ............... 370/392 |

\* cited by examiner

*Primary Examiner*—Pankaj Kumar
*Assistant Examiner*—Duc T Duong
(74) *Attorney, Agent, or Firm*—Townsend and Townsend and Crew LLP

(57) ABSTRACT

A plurality of machine systems constituted by different VLAN constitution methods are integrated on one machine system by using virtual machines. An operation can be switched for virtual network interface cards to VLAN communication corresponding to VLAN ID set to a virtual network interface card or to VLAN communication corresponding to VLAN ID set by OS on a virtual machine using the virtual network interface card depending on whether or not VLAN ID is set.

11 Claims, 8 Drawing Sheets

| VIRTUAL NIC# | MAC ADDRESS | VLAN ID | PHYSICAL NIC# | LPAR# |
|---|---|---|---|---|
| 0 | 00:00:87:00:00:00 | 10 | 0 | 0 |
| 1 | 00:00:87:00:00:01 | 10 | 1 | 1 |
| 2 | 00:00:87:00:00:02 | NONE | 2 | 2 |
| 3 | 00:00:87:00:00:03 | NONE | 3 | 3 |
| . | . | . | . | . |
| . | . | . | . | . |

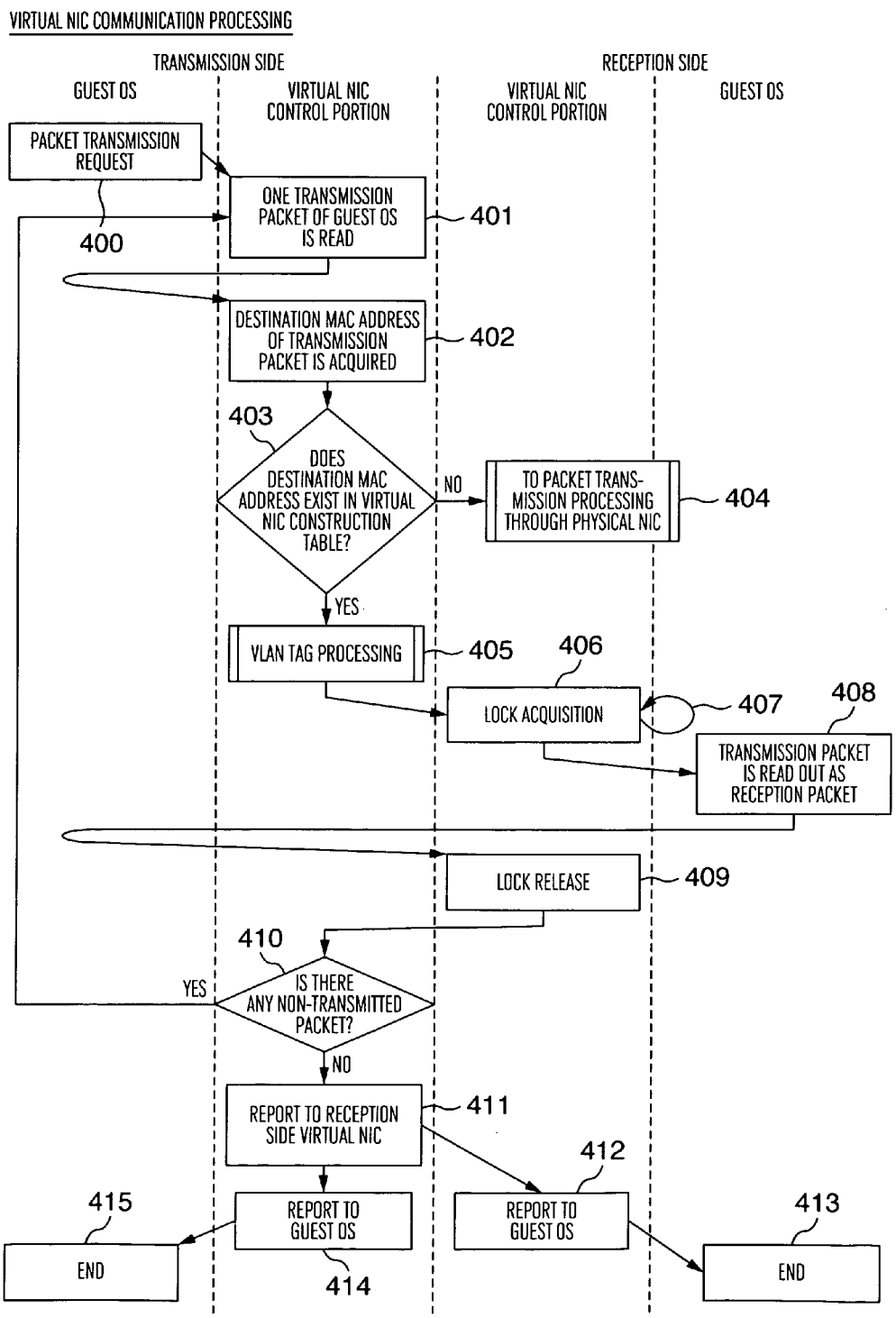

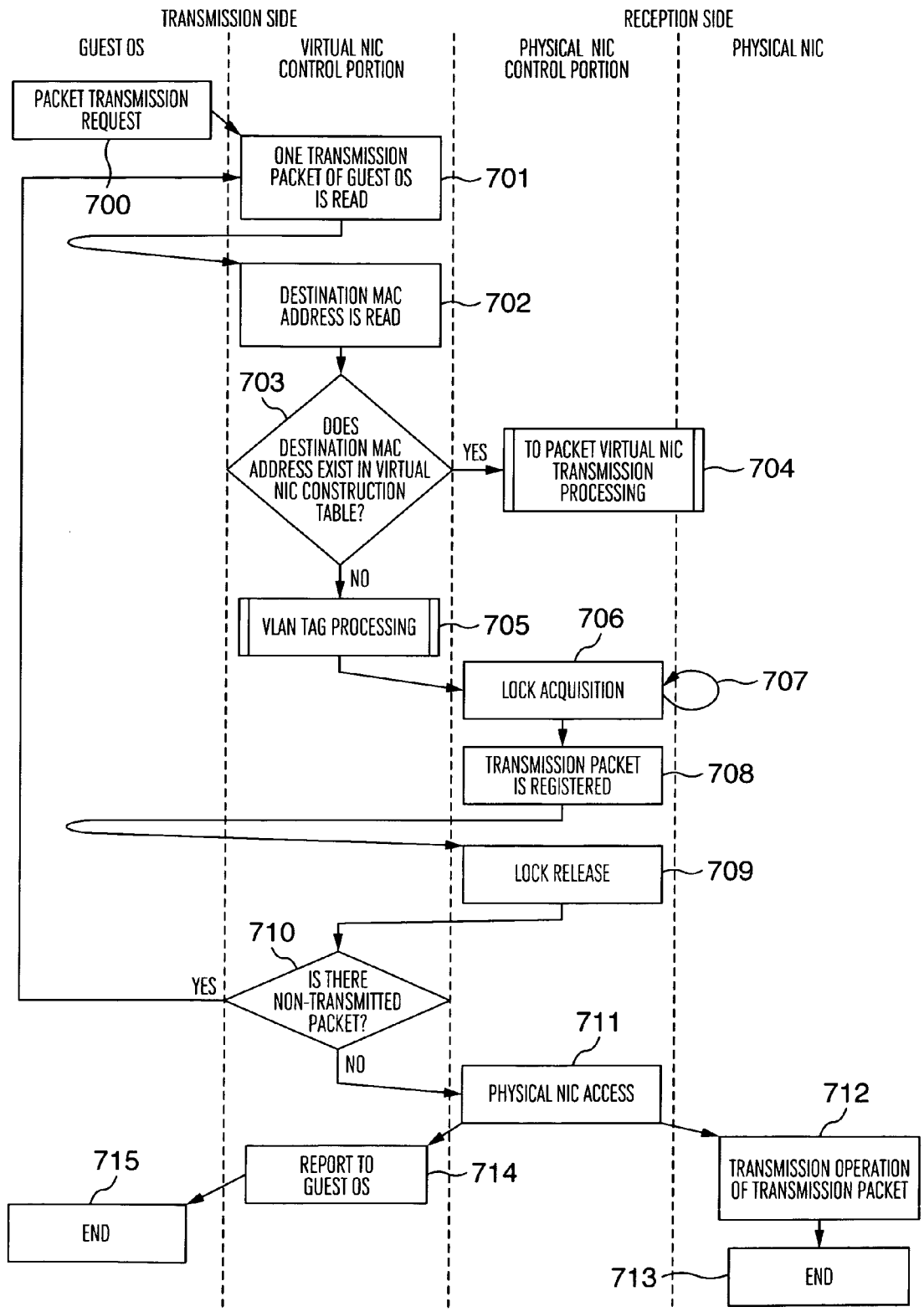

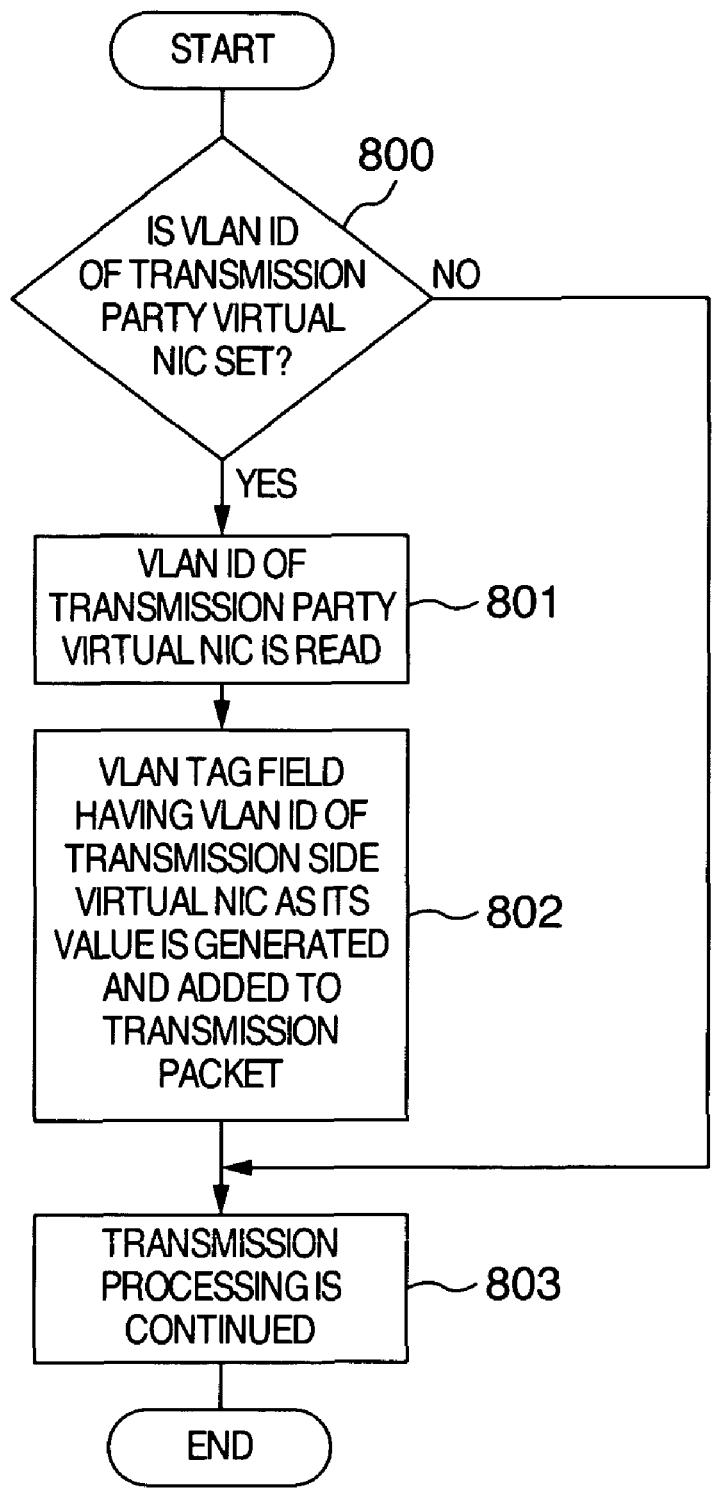

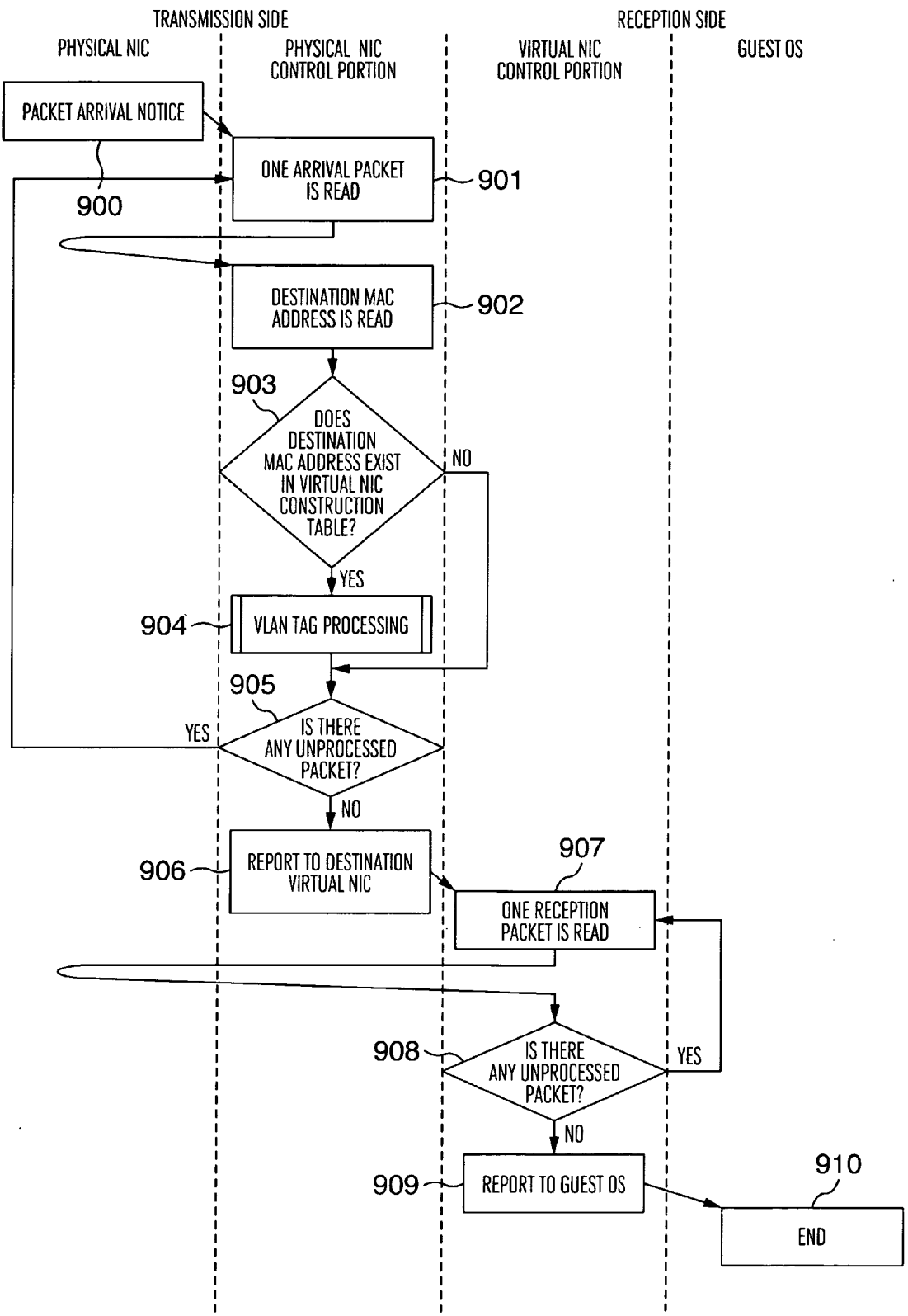

VIRTUAL MACHINE SYSTEM AND METHOD OF NETWORK COMMUNICATION BETWEEN VIRTUAL MACHINES

BACKGROUND OF THE INVENTION

This invention relates to a virtual machine system for executing network communication between virtual machines by using a virtual network interface card. More particularly, the invention relates to a virtual machine system using VLAN for network communication between virtual machines.

A multi-core processor having a plurality of processor cores packaged in one processor package has now made it possible to drastically increase the number of processors that can be utilized by one machine system.

When such a machine system having a large number of processors mounted thereto is utilized by a single OS, there remains the problem that a large number of processor resources are left useless when the system is idle. One of the methods for improving utilization efficiency of the processor resources includes the steps of constituting a plurality of virtual machines by a control program on a machine system, allocating the processor resources of the machine system to the respective virtual machines and simultaneously operating a plurality of virtual machine systems on one machine system.

As for I/O devices on a machine system, on the other hand, the degree of increase of the number of the I/O devices is relatively milder than that of the number of the processors. Therefore, the number of the I/O devices per processor decreases in the machine system having the multi-core processor packaged thereto as described above.

To operate a greater number of virtual machines on a machine system, therefore, it is imperative how to utilize efficiently the I/O devices.

Methods of efficiently utilizing the I/O devices include a method that virtualizes a network interface card as a kind of the I/O devices by a control program and executes network communication between virtual machines without utilizing a network interface card physically packaged to a machine system, and a method that allows a plurality of virtual network interface cards to share a physical network interface card packaged to a machine system by a control program when communication is made between the virtual network interface card and a network outside a virtual machine system.

To execute network communication between a plurality of machine systems, a method that has been customarily employed virtually forms a group without relying on a physical connection form called "VLAN", regards this group as one LAN, transfers traffics through a common network switch among a plurality of machine systems, on one hand, and separates the traffics in accordance with the business content such as an accounting system, a personnel affairs system, a business system, and so forth, on the other.

VLAN has the feature that communication can be mutually made between members belonging to the same VLAN but such communication cannot be seen from members from different VLAN. The VLAN kind includes port base VLAN that forms VLAN in a physical unit of a network switch and tag VLAN that executes VLAN control by adding information called "tag" to a communication packet.

To constitute a business system that has been accomplished by a plurality of machine systems by utilizing VLAN on one machine system by using virtual machines, it is necessary to enable network communication between virtual machines to handle VLAN. A method used in a product called "VMware ESX Server" of VMware Co. is known as a prior art technology accomplishing this business system.

According to VMware Co.: "VMware ESX Server 802.1Q VLAN Solutions", VMware Co. White Paper, html, 2004, two methods are available for the product, that is, a method that constitutes VLAN by utilizing a VLAN function of guest OS on a virtual machine, and a method that constitutes VLAN by a virtual network switch provided by this product without using the VLAN function of the guest OS. Because these two methods can be exclusively utilized with each other, VLAN is constituted by only one of the methods in this product.

In the case where large quantities of virtual machines are operated on a machine system having a large number of processors packaged thereto so as to efficiently use the processors, separate machine systems utilizing VLAN constituted by different methods are integrated in some cases on one machine system by using virtual machines.

Because only one VLAN constitution method is utilizable according to the prior art method described above, however, the VLAN construction of the original machine system must be re-constituted by the utilizable VLAN constitution method when there is any machine system using VLAN that is constituted by the non-utilizable method. In consequence, the number of process steps for integrating the machine system on the virtual machine system increases.

In addition, the VLAN construction of the original machine system cannot always be re-constituted y the utilizable VLAN constitution method. When re-constitution is difficult, the virtual machine system must be re-constituted by dividing the machine system in accordance with each VLAN construction.

SUMMARY OF THE INVENTION

The problems to be solved by the invention is that a plurality of machine systems utilizing VLAN constituted by different methods cannot be integrated on one machine system by using virtual machines.

The most characterizing feature of the invention resides in that a VLAN communication method can be switched depending on whether or not VLAN ID is set to a virtual network interface card.

A virtual machine system according to the invention makes it possible to simultaneously constitute a plurality of machine systems utilizing VLAN constituted by different methods on one virtual machine system by using virtual machines, and has the advantage that the system can more flexibly cope with integration of a plurality of machine systems by virtual machines.

BRIEF DESCRIPTION OF THE INVENTION

FIG. 1 is a block diagram showing a virtual machine system according to an embodiment of the invention;

FIG. 4 is a flowchart of a communication processing between virtual NIC using VLAN;

FIG. 7 is a flowchart of a transmission processing using VLAN between virtual NIC and an external network through physical NIC;

FIG. 8 is a flowchart of a VLAN Tag processing at the time of transmission through physical NIC;

FIG. 9 is a flowchart of a reception processing between an external network and virtual NIC by using VLAN through physical NIC.

DESCRIPTION OF THE EMBODIMENTS

Figure 2:
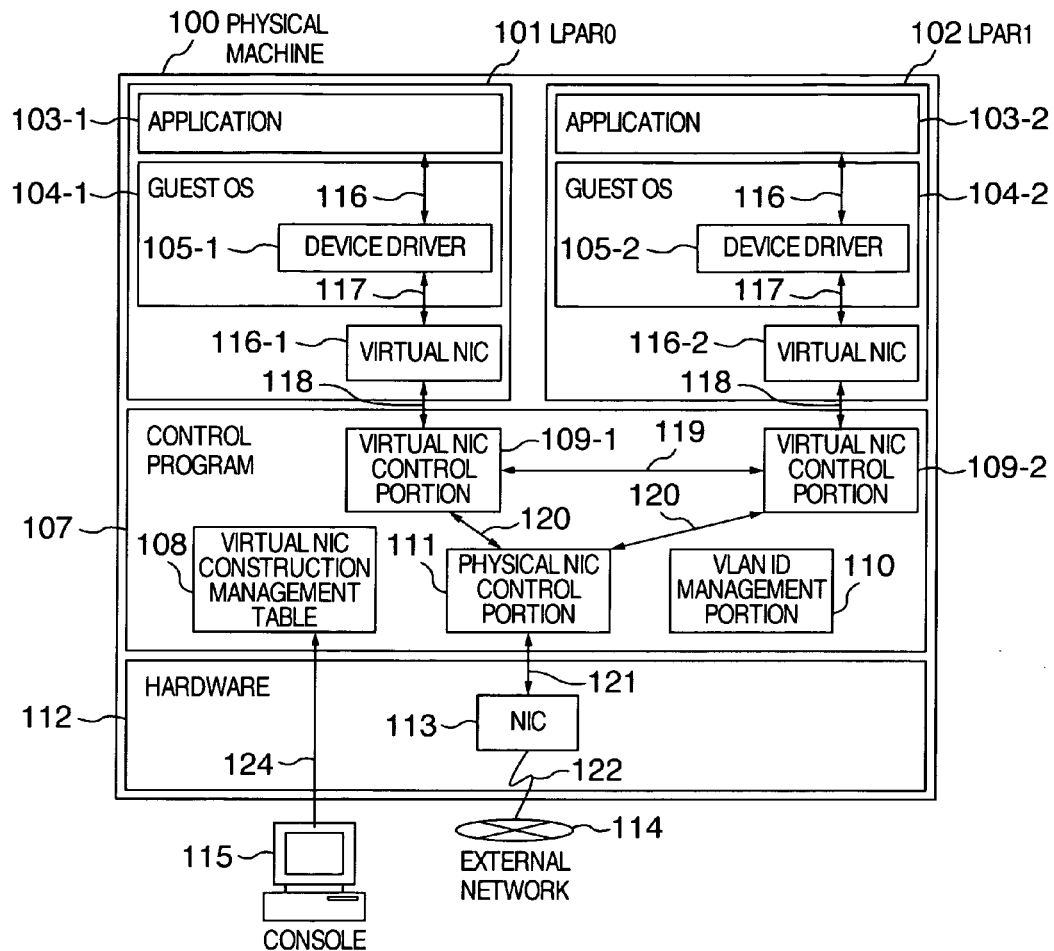
FIG. 2 is a virtual NIC construction management table for managing construction information allocated to virtual NIC.

The invention accomplishes by the following method the object that a plurality of machine systems utilizing VLAN constituted by different methods is simultaneously constituted on one machine system by using virtual machines. Namely, whether VLAN communication corresponding to VLAN ID set to a virtual network interface card is used or VLAN communication corresponding to VLAN ID set by OS on virtual machines using the virtual network interface card is used can be switched depending on whether or not VLAN ID is set to the virtual network interface card.

An embodiment of the invention will be hereinafter explained with reference to the accompanying drawings.

FIG. 1 is a conceptual structural view for illustrating an operation of a virtual machine system to which an embodiment of the invention is applied.

A control program 107 for constituting a plurality of virtual machines (hereinafter called "LPAR") capable of utilizing a virtual network interface card (hereinafter called "virtual NIC") on hardware 112 of a machine 100 operates on this machine 100. The control program 107 constitutes a virtual machine 101 (LPAR0) and a virtual machine 102 (LPAR1) and virtual NIC 106-1 and 106-2 are utilizable on each virtual machine. Incidentally, the numbers of virtual machines and virtual NIC constituted by the control program on the machine system to which the invention can be applied are not limited to the numbers shown in FIG. 1. Guest OS 104-1 and 104-2 operate on the virtual machines. Furthermore, an application 103-1 and 103-2 for executing network communication operates on each OS and executes communication with each virtual NIC 106-1 and 106-2 through a device driver 105-1 and 105-2 of each guest OS (117).

Construction information of each virtual NIC is inputted from a console 115 and is managed by using a virtual NIC construction management table 108 on the control program 107.

FIG. 2 shows an example of the virtual NIC construction management table 108. In the virtual NIC construction management table 108 shown in Table 2, a virtual machine number (LPAR#) to which a management number of each virtual NIC (virtual NIC#), an MAC address, VLAN ID, a physical NIC number (physical NIC#) used for executing communication with an external network and virtual NIC are allocated is managed. The construction information respectively corresponding to the virtual NIC having the virtual NIC# of 0, 1, 2 and 3 is described in FIG. 2, too. In this example, the MAC address capable of primarily specifying the virtual NIC is allocated beforehand to each virtual NIC so that the virtual NIC of the transmission side and the virtual NIC of the reception can be decided by using this address.

Figure 3:
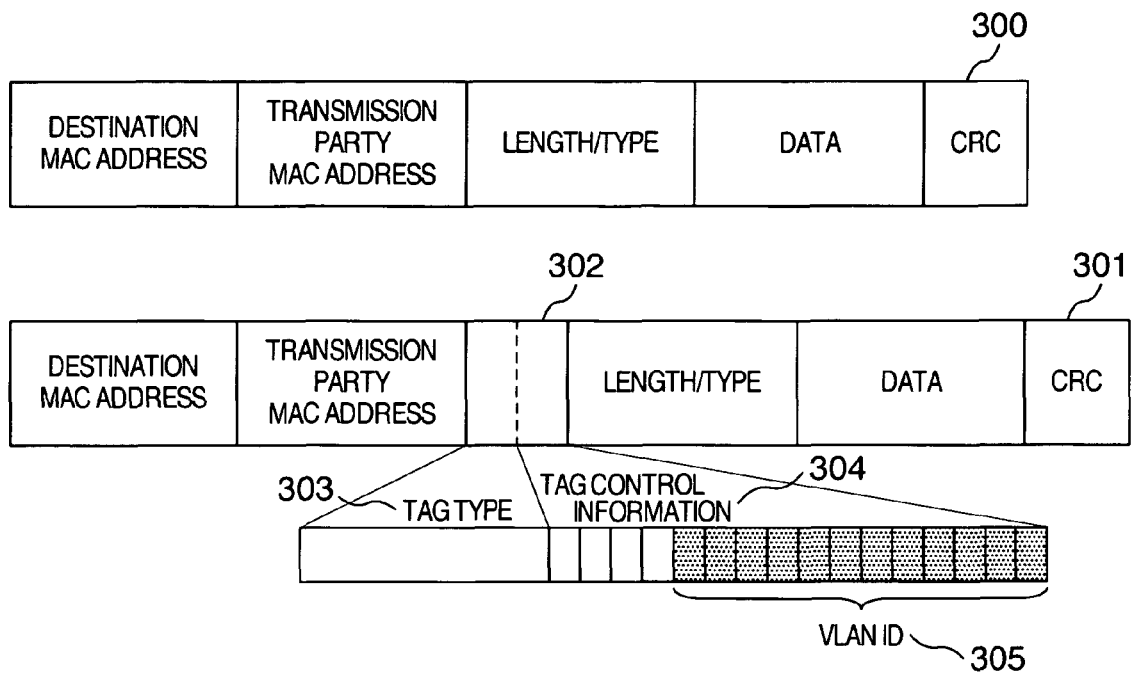
FIG. 3 is a view showing formats of a communication packet containing VLAN Tag and the VLA Tag.

FIG. 3 shows an example 301 of a communication packet containing the VLAN Tag. In this example, the VLAN is accomplished by using tag VLAN standardized by IEEE 802.1Q. The communication packet 301 standardized by IEEE 802.1Q contains a VLAN tag field 302 that is added to a communication packet 300 not containing the VLAN Tag. The VLAN tag field 302 includes a tag type 303 and tag control information 304. Twelve (12) bits in the tag control information 304 are allocated to VLAN ID (305). In this example, the VLAN ID is controlled by using the virtual NIC construction management table 108 shown in FIG. 2 and the VLAN ID defined by IEEE 802.1Q can be allocated to each virtual NIC as represented by virtual NIC#0 and virtual NIC#1 in FIG. 2. It is also possible not to allocate the VLAN ID to each virtual NIC as represented by virtual NIC #2 and virtual NIC #3 in FIG. 2. In this case, the VLAN ID set by the OS on the virtual machine utilizing each virtual NIC is used.

Figure 6:
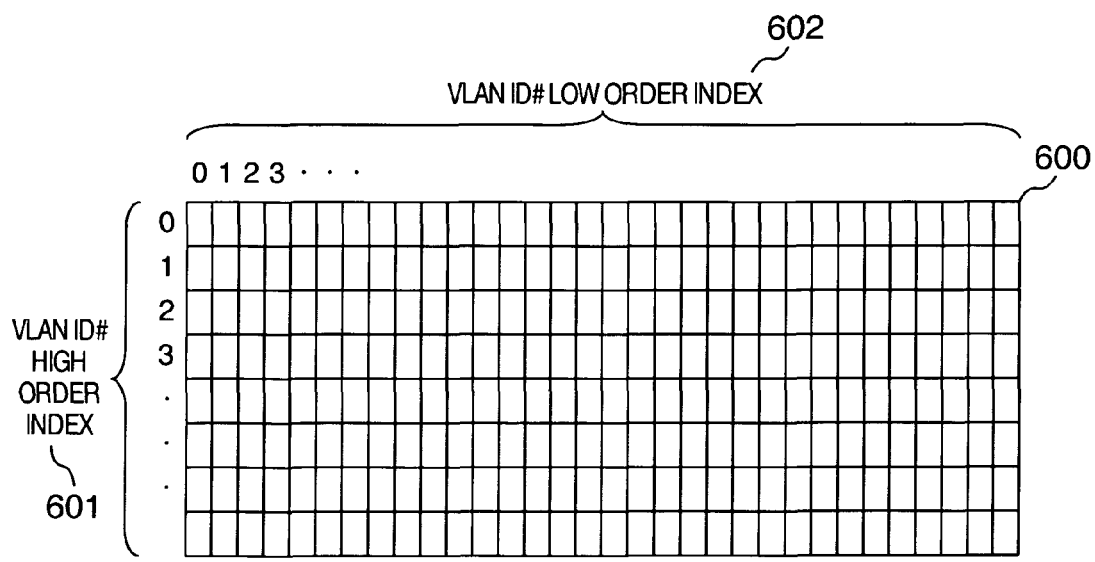
FIG. 6 is a matrix table showing a VLAN matrix used for judging whether or not VLAN ID of a transmitting party can be received by a receiving party virtual NIC.

Next, the communication processing executed by the virtual machine system according to the invention between the virtual NIC by using VLAN will be explained with reference to FIGS. 4 to 6.

It will be hereby assumed for the sake of explanation that the virtual machine of the transmission side is LPAR0 and the virtual machine for the reception side is LPAR1.

To begin with, the transmission side guest OS 104-1 reports a transmission request of the packet to the virtual NIC 106-1 through the device driver 105-1 in step 400 in FIG. 4. At this time, the virtual NIC 106-1 activates a virtual NIC control portion 109-1.

In step 401, the virtual NIC control portion 109-1 activated reads one transmission packet from the guest OS 104-1. In the next step 402, a destination MAC address is acquired from the transmission packet that is read. In step 403, whether or not the destination MAC address exists inside the virtual NIC construction management table 108 is checked. When it does not, the destination is judged as existing in the external network and the flow proceeds to the packet transmission processing (to be later described) through the physical NIC of step 404. When the MAC address exists, the flow proceeds to the VLAN Tag processing of step 405 by judging that the destination is other virtual NIC inside the same machine system.

Next, the VLAN Tag processing 405 between the virtual NIC will be explained with reference to FIG. 5. First, in step 500, whether or not VLAN ID is set to the transmission side virtual NIC is judged by looking up the virtual NIC construction management table 108. When VLAN ID is set to the transmission side virtual NIC, the VLAN ID of the transmission side NIC is read in step 501 from the virtual NIC construction management table 108. VLAN ID inside the transmission packet is read in step 502 when VLAN ID is not set to the transmission side virtual NIC.

In the subsequent step 503, whether or not VLAN ID is set to reception side virtual NIC is judged by looking up the virtual NIC construction management table 108. When VLAN ID is set to the reception side virtual NIC, VLAN ID of reception side virtual NIC is read from the virtual NIC construction management table 108 in step 504 and whether or not VLAN ID of the transmission side that is read in step 501 or 502 is coincident with VLAN ID of the receiving party is judged in step 505.

When these VLAN IDs are coincident, the NIC are judged as belonging to the same VLAN and the communication processing between the virtual NIC is continued (step 506). When these VLAN IDs are not coincident, the NIC are judged as belonging to different VLAN IDs and the report that transmission is not possible is sent to the guest OS on the transmission side in step 507, thereby finishing the communication processing between the virtual NIC.

When VLAN ID is not set to the reception side virtual NIC in step 503, whether or not VLAN ID read in step 501 or 502 is receivable by the reception side virtual NIC is judged in step 508. When it is receivable, the NIC is judged as belonging to the same VLAN and the communication processing between the virtual IC is continued (step 506). When it is not receivable, the NIC is judged as belonging to the different VLAN ID and the report that the transmission is not possible is sent to the transmission side guest OS, thereby finishing the communication processing between the virtual NIC.

In this embodiment, the VLAN ID management portion 110 judges whether or not the transmission side VLAN ID is receivable by the reception side virtual NIC in step 508. The VLAN ID management portion 110 manages by the VLAN ID matrix 600 shown in FIG. 6 VLAN ID, to which guest OS on the virtual machine to which the reception side virtual NIC is allocated belongs. The VLAN ID matrix 600 calculates a VLAN ID# high order index 601 determined by high order digits of VLAN ID and VLAN ID# low order index 602 from the digits of VLAN ID so that the row and column positions of the matrix can be primarily determined by the digits of VLAN ID. The VLAN ID management portion 110 determines whether or not given VLAN ID is receivable by calculating the row and column position of the VLAN matrix by the given VLAN ID and judging on the basis of the resulting value.

Figure 5:
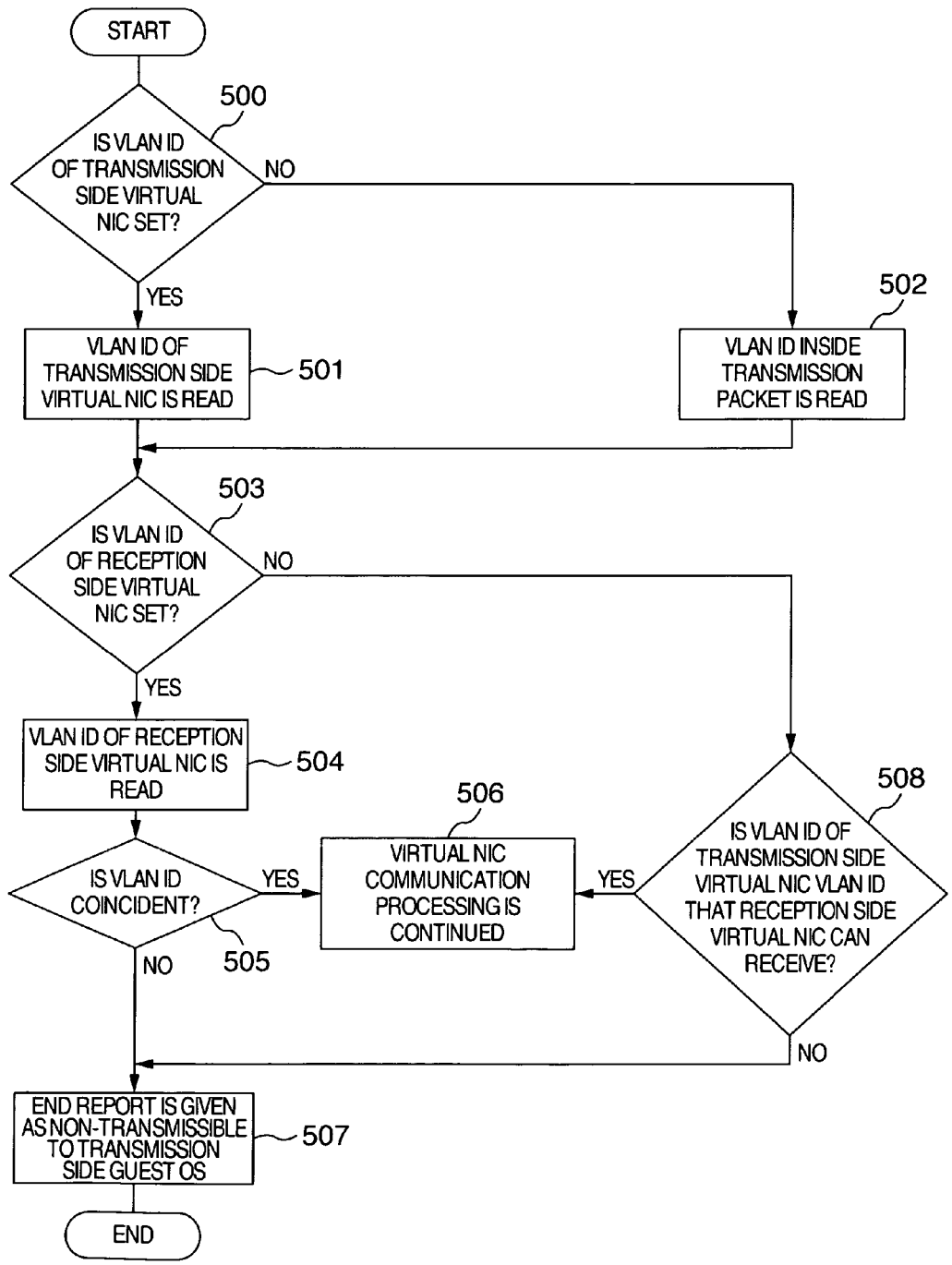
FIG. 5 is a flowchart of a VLAN Tag processing in communication between virtual NIC.

When the VLAN Tag processing shown in FIG. 5 is completed and the transmission side virtual NIC 106-1 and the reception side virtual NIC 106-2 are communicable, the virtual NIC control portion 109-2 of the reception side virtual NIC 106-2 is activated and Lock is acquired to insure that no access from other virtual NIC exists during this processing in step 406 in FIG. 4. When Lock cannot be acquired, acquisition of Lock is repeatedly attempted until it can be acquired (407). When Lock can be acquired, the virtual NIC control portion 109-2 reports the acquisition to the guest OS 104-2 on the reception side through the virtual NIC 106-2 and the device driver 105-2, and the guest OS 104-2 on the reception side reads the transmission packet existing in the guest OS 104-1 on the transmission side as the reception packet in step 408.

Subsequently, Lock of the reception side virtual NIC control portion 109-2 acquired in step 406 is released in step 409 and the release of the lock is reported to the transmission side virtual NIC control portion 109-1. In the next step 410, whether or not the transmission packet not yet sent remains in the transmission party guest OS 104-1 is judged. When it does, the procedures of steps 401 to 410 are repeated until the packets not transmitted do not remain any longer. When the packet not yet transmitted does not remain any longer and transmission is judged in step 410 as being completed, the transmission finish report is given to the reception side virtual NIC in step 411 and the virtual NIC control portion 109-2 receiving the report reports the end to the reception side guest OS 104-2 through the virtual NIC 106-2 and the device driver 105-2, thereby finishing the processing of the reception side guest OS (413).

The virtual NIC control portion 109-1 reports completion to the transmission side OS 104-1 through the virtual NIC 106-1 and the device driver 105-1 and the processing of the transmission side guest OS is completed (415).

Next, in the virtual machine system to which the invention is applied, the communication process using VLAN between the virtual NIC and the external network through the physical NIC will be explained with reference to FIGS. 7 to 10.

It will be assumed for the sake of explanation in this embodiment that the virtual machine on the transmission side is LPAR0 and the computer 100 is connected to the external network 114 through the physical NIC 113 on the hardware 112.

The transmission sequence from the virtual NIC to the external network through the physical NIC will be first explained with reference to FIGS. 7 and 8 and then the reception sequence of the virtual NIC from the external network through the physical NIC will be explained with reference to FIGS. 9 and 10.

The first portion of the transmission sequence from the virtual NIC to the external network through the physical NIC is the same as the transmission sequence between the virtual NIC that has already been explained with reference to FIG. 4. First, in step 700 shown in FIG. 7, the transmission side guest OS 104-1 reports the transmission request of the packet to the virtual NIC 106-1 through the device driver 105-1. The virtual NIC 106-1 activates at this time the virtual NIC control portion 109-1.

The virtual NIC control portion 109-1 thus activated reads in step 701 one transmission packet from the guest OS 104-1. Next, the destination MAC address is acquired in step 702 from the transmission packet so read. In the subsequent step 703, whether or not the destination MAC address exists in the virtual NIC construction management table 108 is checked. When it does, the MAC address is judged as being other virtual NIC in the machine system having the same destination and the communication sequence between the virtual NIC explained with reference to FIG. 4 is executed. When the destination MAC address does not exist, the destination is judged as existing in the external network and the flow proceeds to the VLAN Tag processing of step 705.

Next, the VLAN Tag processing in the transmission from the virtual NIC to the external network through the physical NIC will be explained with reference to FIG. 8. First, whether or not the VLAN ID is set to the transmission side virtual NIC is judged in step 800 by looking up the virtual NIC construction management table 108. When the VLAN ID is not set to the transmission side virtual NIC, the transmission packet may be as such transmitted to the external network. Therefore, the next transmission processing is as such continued without ding anything in particular (step 803). When the VLAN ID is set to the transmission side virtual NIC, the VLAN ID of the transmission side virtual NIC is read in step 801 from the virtual NIC construction management table 108 and a VLAN tag field 302 having a value of VLAN ID of the transmission side virtual NIC is generated in step 802. After this tag field 302 is added to the transmission packet, the next transmission processing is continued (step 803).

After the VLAN Tag processing explained with reference to FIG. 8 is completed, the physical NIC control portion 111 is activated. To insure that the access from other NIC does not arise during this processing, Lock is acquired in step 706 shown in FIG. 7. When the acquisition of Lock does not succeed, the acquisition of Lock is repeatedly attempted (step 707). When Lock is acquired, the packet to be transmitted is registered in step 708. In this embodiment, the transmission packets are not individually transmitted to the physical NIC but are once registered in step 708 and are thereafter sent collectively to the physical NIC. In the subsequent step 709, Lock is released and whether or not the transmission packets not yet transmitted exist is checked in step 710 by the virtual NIC control portion 109-1 on the transmission side. The procedures from steps 701 to 709 are repeatedly executed as long as the transmission packets not yet transmitted exist.

When the transmission packet is not judged as existing any longer in step 710, the physical NIC control portion starts gaining access to the physical NIC 113 in step 711 and at the same time, reports the access to the physical NIC 113 to the virtual NIC control portion 109-1 on the transmission side. The physical NIC 113 thereafter executes in step 712 the transmission operation of the transmission packet registered by the physical NIC control portion 111 in step 708 and the processing of the physical NIC is completed by the completion of the transmission operation (step 713). On the other hand, the virtual NIC control portion 109-1 on the transmission side that receives the access report to the physical NIC 113 reports in step 714 the transmission completion to the guest OS 104-1 through the virtual NIC 106-1 and the device driver 105-1, and the guest OS 104-1 receiving this report completes the transmission operation (step 715).

Next, the reception sequence of the communication packet by the virtual NIC from the external network through the physical NIC will be explained with reference to FIGS. 9 and 10.

First, the reception of the packet by the physical NIC 113 from the network 114 is reported in step 900 to the physical NIC control portion 111. Receiving the report, the physical NIC control portion 111 reads in step 901 one reception packet arriving from the physical NIC 113 and further reads in step 902 the MAC address of the destination from the reception packed read. In the subsequent step 903, whether or not the destination MAC address exists in the virtual NIC construction management table 108 is judged in step 903 by looking up the virtual NIC construction management table 108. When the MAC address exists inside the virtual NIC construction management table 108, the flow proceeds to the VLAN Tag processing of step 904 on the assumption that this packet is received. When the MAC address does not exist inside the virtual NIC construction management table 108, the packet need not be received and the flow proceeds to step 905 without doing anything in particular.

Next, the VLAN Tag processing at the time of reception from the external network to the virtual NIC through the physical NIC will be explained with reference to FIG. 10. First, the VLAN ID is read out from the reception packet in step 1000. Subsequently, whether or not the VLAN ID is set to the reception side virtual NIC determined by the destination MAC address of the reception packet is judged in step 1001 by looking up the virtual NIC construction management table 108. When the VLAN ID is set to the reception side virtual NIC, the VLAN ID of the reception side virtual NIC is read in step 1002 from the virtual NIC construction management table 108. Next, whether or not the VLAN ID of the reception packet read out in step 1000 and the VLAN ID set to the reception side virtual NIC read out in step 1002 are coincident are judged in step 1003.

When the two kinds of VLAN ID are coincident, this packet is judged as receivable by the reception side virtual NIC. After the reception side virtual NIC is registered in step 1004 as the destination virtual NIC of the packet received from the external network, the next reception processing is continued (step 1006). When the two kinds of VLAN ID are not coincident, the packet is not judged as receivable by the reception side virtual NIC and the destination NIC is not registered and the next reception processing is continued (step 1006).

When the VLAN ID is not set to the reception side virtual NIC in the judgment of step 1001, whether or not the VLAN ID of the reception packet is receivable by the reception side virtual NIC is judged in step 1005 by calling the VLAN ID management portion 110 and looking up the VLAN ID matrix 600 of the reception side virtual NIC. When the VLAN ID of the reception packet is found as the VLAN ID that can be received by the reception side virtual NIC, the reception side virtual NIC is registered as the destination virtual NIC of the packet received from the external network in step 1004 and the next reception processing is continued (step 1006). When the VLAN ID of the reception packet is found as the VLAN ID that cannot be received by the reception side virtual NIC, registration of the destination NIC is not made and the next reception processing is continued (step 1006).

Figure 10:
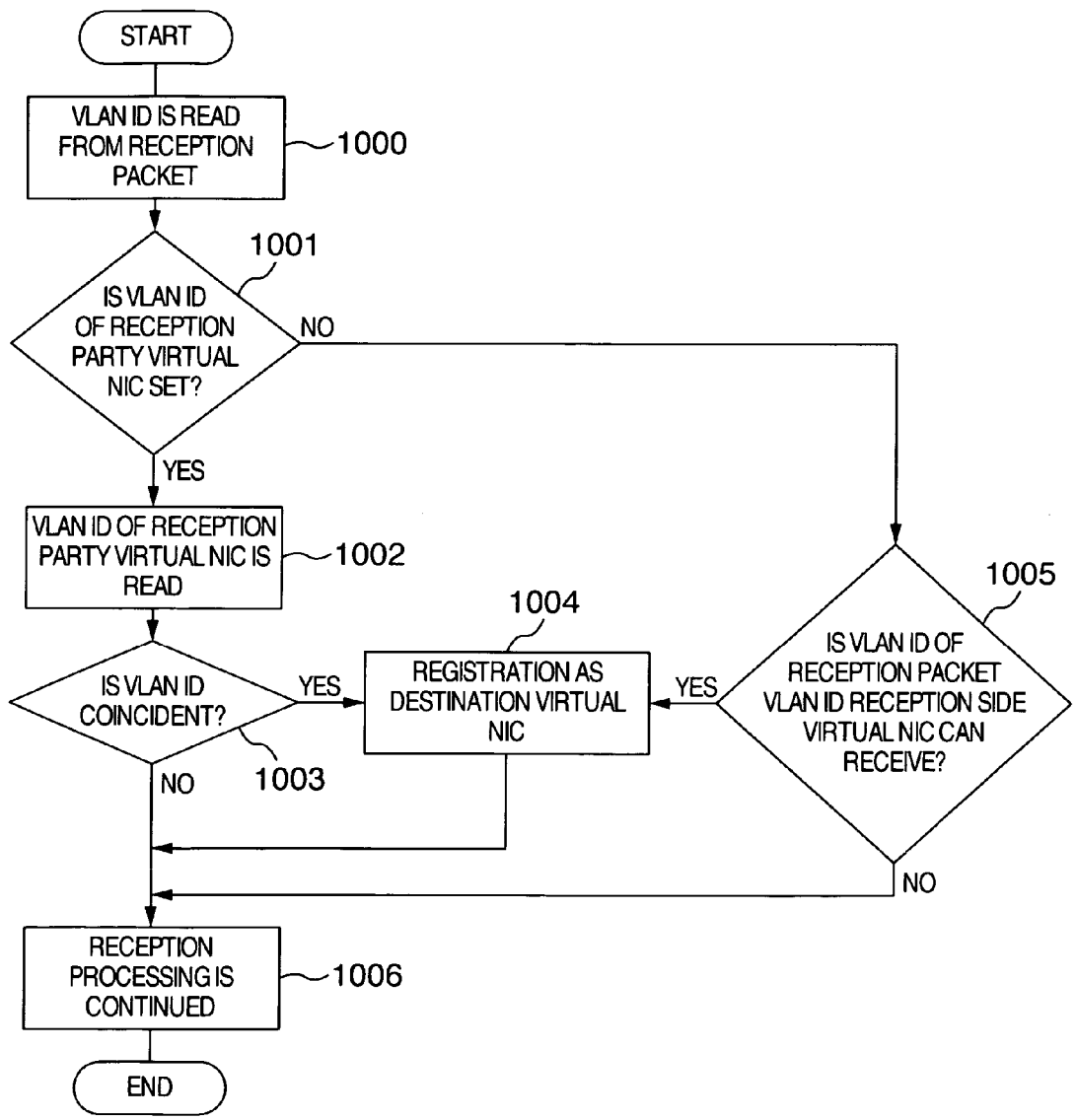
FIG. 10 is a flowchart of a VLAN Tag processing at the time of reception through physical NIC.

After the VLAN Tag processing explained with reference to FIG. 10 is completed, the physical NIC control portion 111 confirms in step 905 in FIG. 9 whether or not the reception packet not yet processed exists in the physical NIC 113. When the unprocessed reception packet exists, the procedures of steps 901 to 904 are repeated until the unprocessed reception packet not longer exist in the physical NIC.

When the unprocessed reception packet no longer exists in the physical NIC 113 in step 905, the physical NIC control portion 111 activates in step 906 the virtual NIC control portion of the virtual NIC as the destination of the reception packet. The virtual NIC control portion so activated reads one reception packet addressed to the virtual NIC from the physical NIC and then judges in step 908 whether or not the unprocessed packet exists. The step 907 is repeatedly executed until the unprocessed reception packet no longer exists. When the unprocessed reception packet does not exist in step 908, the virtual NIC control portion reports in step 909 the reception completion to the guest OS through the virtual NIC and the device driver. The guest OS receives this report and completes the reception processing (910).

The VLAN communication method of the virtual network interface card is switched depending on whether or not the VLAN ID is set to the virtual network interface card. By so doing, a plurality of VLAN constitution methods can be simultaneously constituted inside a virtual machine system operating on one machine system and the invention can be applied to the application for integrating a plurality of machine systems constituted by using different VLAN constitution methods on one machine system by a virtual machine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A virtual machine system including a plurality of virtual machines constituted by a control program on a physical machine and virtual NIC (virtual network interface cards) for executing network communication between said plurality of virtual machines provided by said control program, said virtual machine system comprising:

a virtual NIC controller for setting VLAN ID to said virtual NIC from said control program, and when said virtual NIC has received a packet, said virtual NIC controller confirming a VLAN ID set in a transmission side virtual NIC which transmitted said packet; and a VLAN (virtual local area network) manager for managing said VLAN ID set to said virtual NIC and a VLAN ID set by an OS (operating system) on one of said virtual machines that uses said virtual NIC, wherein said virtual NIC controller, when said VLAN ID is set to said transmission side virtual NIC, performs actions to:

reads out said VLAN ID of said transmission side virtual NIC;

judges whether or not VLAN ID is set to a reception side virtual NIC;

reads out VLAN ID of said reception side virtual NIC when VLAN ID is set to said reception side virtual NIC; and reports packet reception to a guest OS of a reception side virtual machine via said reception side NIC when VLAN ID of said transmission side virtual NIC coincides with VLAN ID of said reception side virtual NIC, wherein said guest OS reads a transmission packet sent from said transmission side virtual NIC as a reception packet.

2. A virtual machine system as defined in claim 1, said virtual NIC controller comprises means for judging whether or not communication is possible between virtual NIC on the transmission side and virtual NIC on the reception side by using VLAN ID set by OS on a virtual machine using said transmission side virtual NIC when said VLAN ID is not set to said transmission side virtual NIC.

3. A virtual machine system as defined in claim 1, which further comprises means for gaining access to physical NIC (physical network interface card) of said physical machine, means for transmitting a transmission packet from said physical NIC when a destination of said packet transmitted from said virtual NIC is directed to a network outside said virtual machine system, and means for allowing said virtual NIC to receive a reception packet when said physical NIC receives said packet directed to said virtual NIC from the network outside said virtual machine system, wherein said virtual NIC can communicate with the network outside said virtual machine system by said physical NIC while constituting VLAN.

4. A network communication method of a virtual machine system including a plurality of virtual machines constituted by a control program on a physical machine and virtual NIC (virtual network interface cards) for executing network communication between said plurality of virtual machines provided by said control program, said network communication method comprising the steps of:

setting VLAN ID to said virtual NIC by said control program, and when said virtual NIC has received a packet, confirming a VLAN ID set in a transmission side virtual NIC which transmitted said packet; or setting VLAN ID by OS (operating system) on a virtual machine using said virtual NIC, and when said virtual machine has received a packet, confirming a VLAN ID set in a transmission side virtual machine which transmitted said packet;

reading out VLAN ID of said transmission side virtual NIC when VLAN ID is set to said transmission side virtual NIC;

judging whether or not VLAN ID is set to a reception side virtual NIC;

reading out VLAN ID of said reception side virtual NIC when VLAN ID is set to said reception side virtual NIC; and reporting packet reception to a guest OS of a reception side virtual machine via said reception side NIC when VLAN ID of said transmission side virtual NIC coincides with VLAN ID of said reception sid virtual NIC, wherein said guest OS reads a transmission packet sent from said transmission side virtual NIC as a reception packet, thereby executing VLAN communication between said transmission sided and said reception side virtual NICs by using VLAN ID set when said VLAN ID is set to said transmission side virtual NIC; and executing VLAN communication between said transmission sided and said reception side virtual NICs by using VLAN ID set by said OS on said virtual machine when said VLAN ID is not set to said transmission side virtual NIC.

5. A network communication method of a virtual machine system as defined in claim 4, wherein said physical machine of said virtual machine system includes physical NIC (physical network interface cards), and which further comprises the steps of transmitting a transmission packet from said physical NIC when the destination of said transmission packet transmitted from said virtual NIC is addressed to a network outside said virtual machine system, and allowing said virtual NIC to receive a reception packet when said physical NIC receives a packet address to said virtual NIC from the network outside said virtual machine system.

6. A network communication method of a virtual machine system including a plurality of virtual machines constituted by a control program on a physical machine and virtual NIC (virtual network interface cards) for executing network communication between said plurality of virtual machines, provided by said control program in such a fashion as to correspond to each of said virtual machines, said method comprising the steps of:

preparing in advance a construction management table for storing construction information of each of said virtual NIC inclusive of an MAC address set to each virtual NIC;

causing guest OS (operating system) of a transmission side virtual machine to send a transmission request of a transmission packet containing at least a destination MAC address and VLAN ID to virtual NIC of said transmission side virtual machine and causing said control program to judge at this time whether or not the destination MAC address of said transmission packet exists in said construction management table;

judging whether or not VLAN ID is set to transmission side virtual NIC by looking up said construction management table when the destination MAC address of said transmission packet exists in said construction management table;

reading out VLAN ID of the transmission side virtual NIC when VLAN ID is set to the transmission side NIC;

judging whether or not VLAN ID is set to reception side virtual NIC;

reading out VLAN ID of the reception side virtual NIC when VLAN ID is set to the reception side virtual NIC;

reporting packet reception to guest OS of the reception side virtual machine through the reception side virtual NIC when VLAN ID of the transmission side virtual NIC read out is coincident with VLAN ID of the reception side virtual NIC; and allowing guest OS of said reception side virtual machine receiving the report to read the transmission packet arriving in guest OS of said transmission side virtual machine as a reception packet.

7. A network communication method of a virtual machine system as defined in claim 6, wherein said control program reads out VLAN ID inside said transmission packet when VLAN ID is not set to said transmission side virtual NIC, whether or not VLAN ID is set to said reception side virtual NIC by looking up said construction management table, VLAN ID of said reception side virtual NIC set is read out when VLAN ID is set to said reception side virtual NIC, packet reception is reported to guest OS of said reception side virtual machine through said reception side virtual NIC when VLAN ID inside said transmission packet read out is coincident with VLAN ID of said reception side virtual NIC, and guest OS of said reception side virtual machine receiving the report reads a transmission packet in guest OS of said transmission side virtual machine as a reception packet.

8. A network communication method of a virtual machine system as defined in claim 6, wherein said control program judges whether or not VLAN ID of said transmission side virtual NIC is VLAN ID receivable by said reception side virtual NIC when VLAN ID is not set to said reception side virtual NIC, packet reception is reported to guest OS of said reception side virtual machine through said reception side virtual NIC when VLAN ID of said transmission side virtual NIC is VLAN ID that can be received by said reception side virtual NIC, and guest OS of said reception side virtual machine receiving the report reads a transmission packet in guest OS of said transmission side virtual machine as a reception packet.

9. A network communication method of a virtual machine system as defined in claim 8, wherein said control program reports transmission completion to guest OS of said transmission side virtual machine when VLAN ID of said transmission side virtual NIC is not VLAN ID that can be received by said reception side virtual NIC.

10. A network communication method of a virtual machine system as defined in claim 6, wherein said control program reports transmission completion to guest OS of said transmission side virtual machine when VLAN ID of said transmission side virtual NIC is not coincident with VLAN ID of said reception side virtual NIC.

11. A network communication method of a virtual machine system as defined in claim 6, wherein physical NIC (physical network interface card) is prepared in advance, and said control program judges whether or not VLAN ID is set to said transmission side virtual NIC by looking up said construction management table when a destination MAC address of said transmission packet does not exist in said construction management table, reads out VLAN ID of said transmission side virtual NIC set when VLAN ID is set to said transmission side virtual NIC, generates a VLAN tag field having VLAN ID of said transmission side virtual NIC read out as its value, adds said VLAN tag field to said transmission packet and transmits said transmission packet to the outside of said virtual machine system through said physical NIC.

* * * * *